Aug. 28, 1934.  B. F. FITCH  1,971,339
FREIGHT HANDLING APPARATUS
Filed March 26, 1932  4 Sheets-Sheet 1
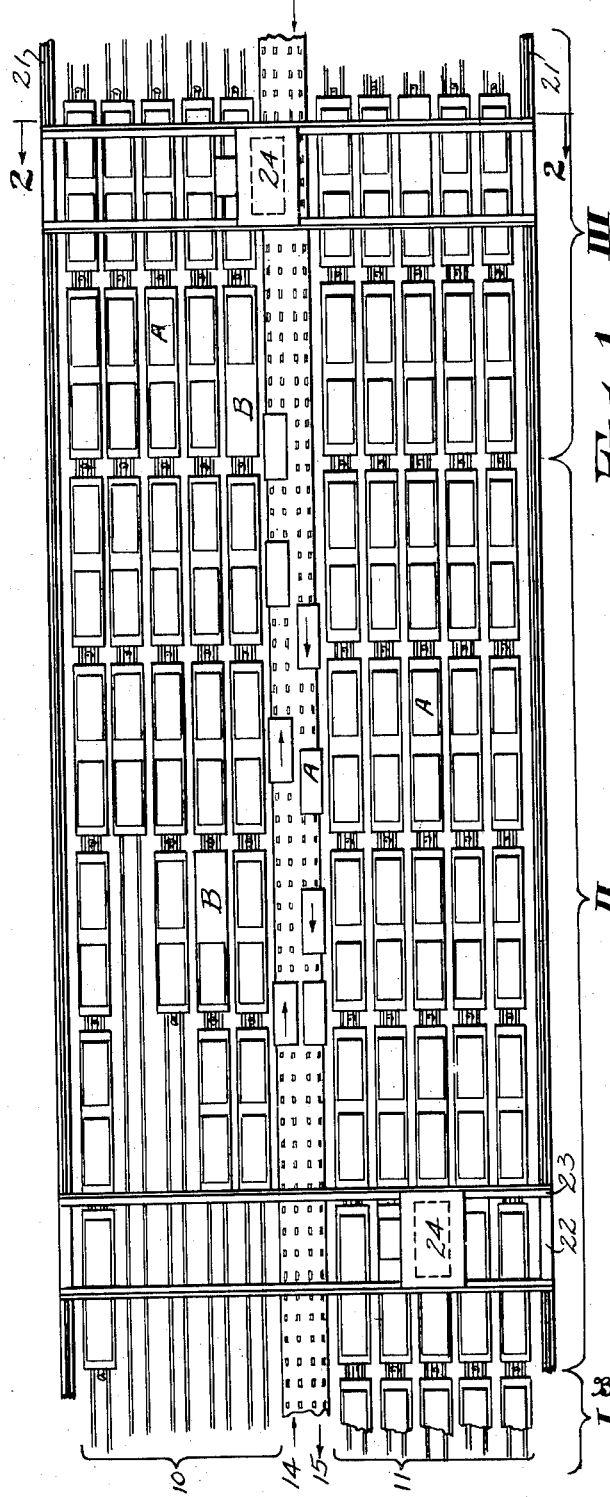
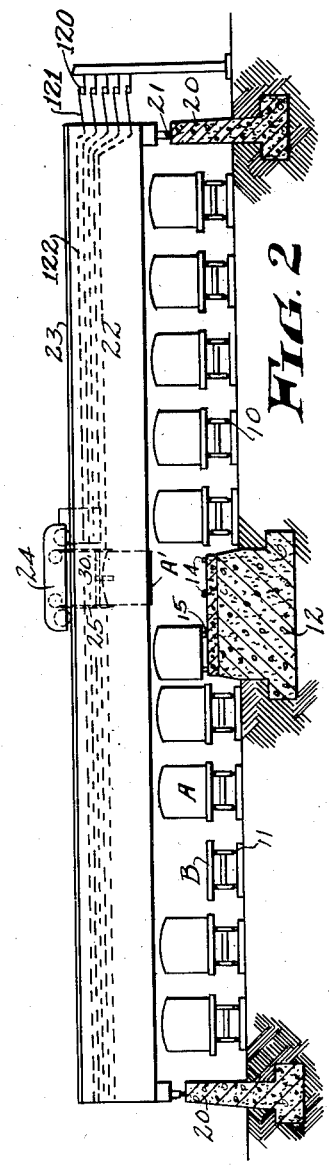
Inventor
Benjamin F. Fitch,
By Baker, Golnek & Fear
Attorneys.

Aug. 28, 1934.  B. F. FITCH  1,971,339
FREIGHT HANDLING APPARATUS
Filed March 26, 1932   4 Sheets-Sheet 2

Inventor
Benjamin F. Fitch,
By Bates, Golrick & Fear,
Attorneys

Patented Aug. 28, 1934

1,971,339

UNITED STATES PATENT OFFICE 1,971,339

FREIGHT HANDLING APPARATUS

Benjamin F. Fitch, Greenwich, Conn., assignor to Motor Terminals Company, New York, N. Y., a corporation of Delaware Application March 26, 1932, Serial No. 601,428

4 Claims. (Cl. 214—38)

This invention relates to a freight-handling system and is primarily concerned with the provision of suitable apparatus to control the rapid classification of freight containers received on various incoming trains, as the containers are transferred to make up an outgoing train. For instance, I may employ within a suitable depot a freight-handling system by the operation of which I conveniently remove a freight container from one transporting vehicle and convey it to a second vehicle. By reason of my invention it is possible to control the operation of such a freight handling system from any desired vantage point.

My present invention may be used in a freight handling system similar to that shown in my copending application numbered 707,707 for a Freight handling apparatus, which I filed January 22nd, 1934. The invention of that application includes the broad features of a plurality of vehicle trackways and adjacent conveyors, together with cranes adapted to transport freight containers or other objects from one to the other.

For example, I may provide a vehicle trackway and a roller conveyor alongside served at different regions along its length by overhead traveling cranes. One crane may lift a container or demountable body from a vehicle on the trackway and deposit it on the conveyor. The conveyor then carries the body to the region served by the traveling crane, which can most conveniently move to overlie the vehicle on a second trackway to which the demountable body is to be transferred. If desired, a plurality of such conveyors acting to convey bodies in different directions may be employed.

The apparatus of my present disclosure is concerned with mechanism for controlling the conveyors of such a system, either automatically by means of a movement of a body to be conveyed thereon or such control may be effected from a crane cab or other vantage point.

To prevent bodies on a conveyor from interfering with other bodies thereon, as well as to prevent a body being carried past its destination, in case the crane in that region was not available at that time to take the body from the conveyor, I have arranged each roller conveyor in a succession of groups corresponding to the crane areas; and I provide a system of control whereby the operator for any region may stop the movement of the entire set of conveyor rollers whenever desired. I provide means, however, whereby the operator for any region may again start his set of conveyor rollers without starting the other rollers. This enables the entire conveyor to operate as a unit until there becomes congestion in any particular region; whereupon the operator for that region may stop the balance of the conveyor and operate the conveyor for his own region only to clear up the traffic.

Each crane of my system is provided with an automatically operating suspended cradle which is adapted to be actuated by the operator whenever desired to engage a body over which the cradle is lowered, whereby the body may be raised and transported, the cradle operating automatically to release the body after it has been lowered.

The control of the traveling crane, including the longitudinal movement of the bridge; the transverse movement of the raising mechanism therein; the raising and lowering of the cradle and the engagement and release thereof; as well as the control of the various groups of conveyors, may all be effected from the cab of the traveling crane.

My invention comprises the control of a classification apparatus embodying the features of operation above outlined, though it is not necessarily limited to the employment of all of these features. The invention includes also various minor features contributing to the general operation, as hereinafter more fully explained in connection with the embodiment illustrated in the drawings.

In the drawings:

Fig. 1 is a fragmentary plan of a classification station made in accordance with my invention, embodying the apparatus for one block and portions of adjoining blocks at each end thereof;

Fig. 2 is a vertical cross section of the apparatus;

Figure 7:
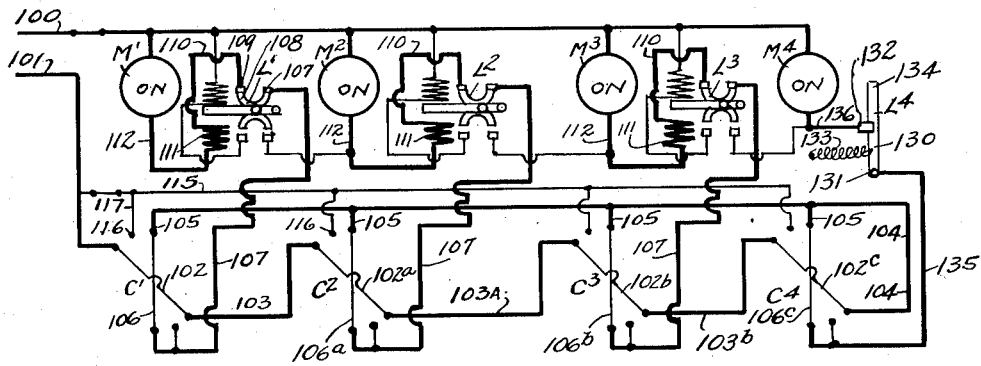
Figure 8:
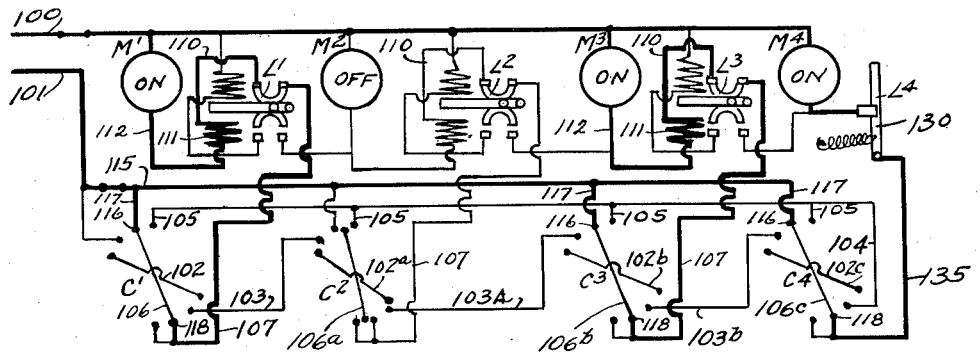
Figure 9:
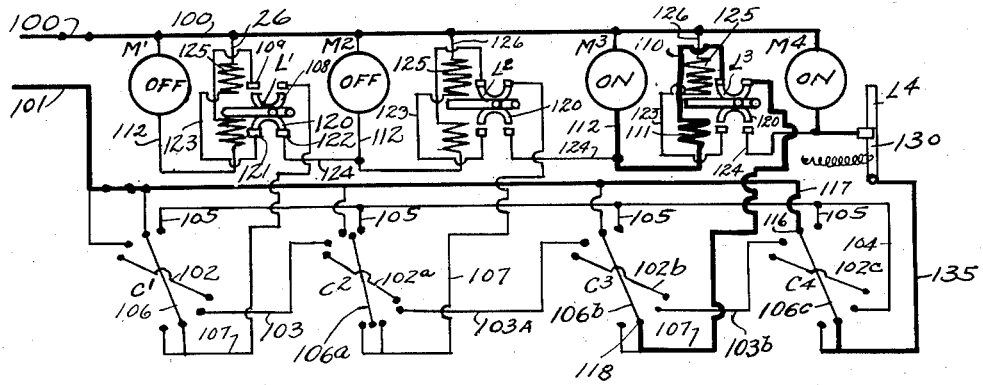
Figure 10:
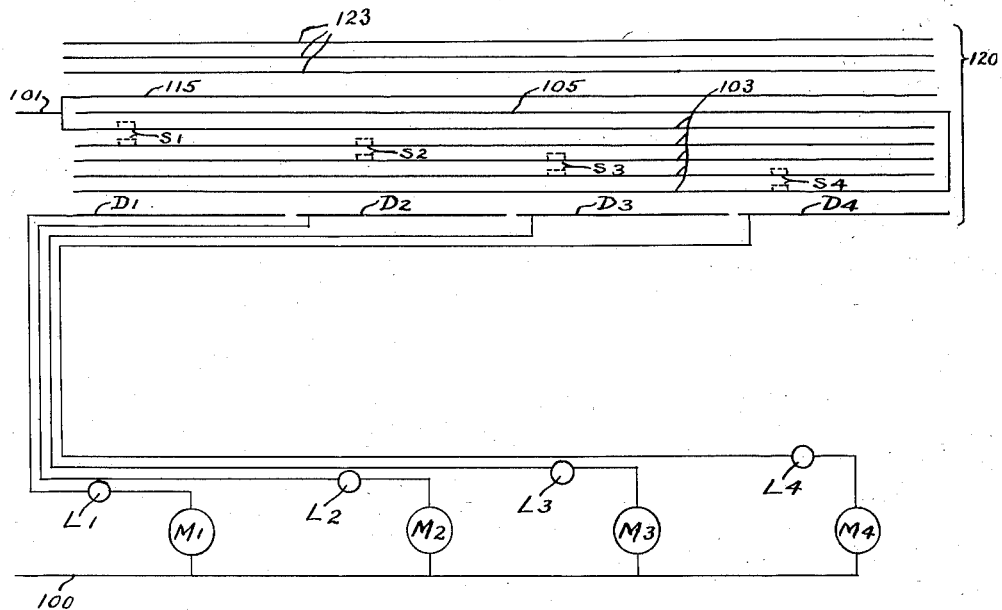

The remaining figures are diagrams illustrating an electric control for the floor conveyor: Fig. 7 showing the connections when all of the conveyor motors are on; Fig. 8 when some are turned on and some off, and Fig. 9 when some of the motors are off due to the action of an overload relay circuit. Fig. 10 is a diagram showing the control of the floor conveyor from the crane cab.

Referring first to Figs. 1 and 2, I have shown a classification station having two groups of parallel tracks 10 and 11. Intermediate of these groups is a suitable longitudinal raised platform 12 extending the length of the station and having its top preferably at about the same height as the floors of cars on the tracks. On this platform are two floor conveyors 14 and 15, each made up of power-driven floor rollers as hereinafter explained. At the extreme edges of the station are longitudinal piers 20 supporting trackways 21 for the traveling cranes, of which there are several.

Each traveling crane comprises a bridge 22 having wheels riding on rails 21. Each bridge has a transverse trackway 23 upon which travels the crane proper 24. This crane has one or more depending cables supporting the cradle. There are preferably four cables 25 depending at the four corners of a rectangle, and thus supporting, in a horizontal plane, the cradle 30 which is provided with suitable shackles to engage the demountable body.

The bridge 22 stands such distance above the tracks that it may travel over bodies on cars on the tracks; and the raising mechanism with its cradle is adapted to lift the body to a height sufficient to travel over any other bodies beneath the bridge.

In Figs. 1 and 2, A indicates the demountable bodies, and B indicates various flatcars on the tracks. It will be seen that, with the apparatus shown, I am able to pick up a body from any car, elevate it, transport it longitudinally by the movement of the bridge and laterally by the movement of the crane mechanism, and then deposit the body either on some other flatcar or on either of the floor conveyors carried by the platform 12. If no other body is in the path of transfer, it is sufficient to raise the body simply enough to clear any retaining devices on the car; and such height will enable the body to clear the floor conveyors. Where a low path is not available, the body is raised sufficiently to clear other bodies, as illustrated by the raised body A', in Fig. 2.

Figure 3:
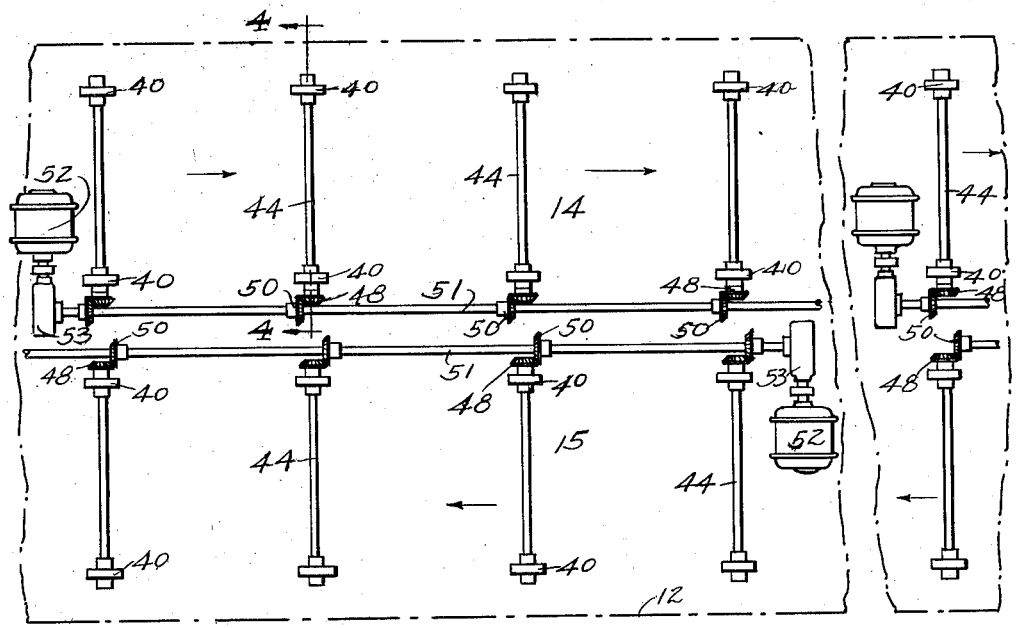
Fig. 3 is a diagrammatic plan of some of the floor rollers constituting a portion of the longitudinal conveying system.
Figure 4:
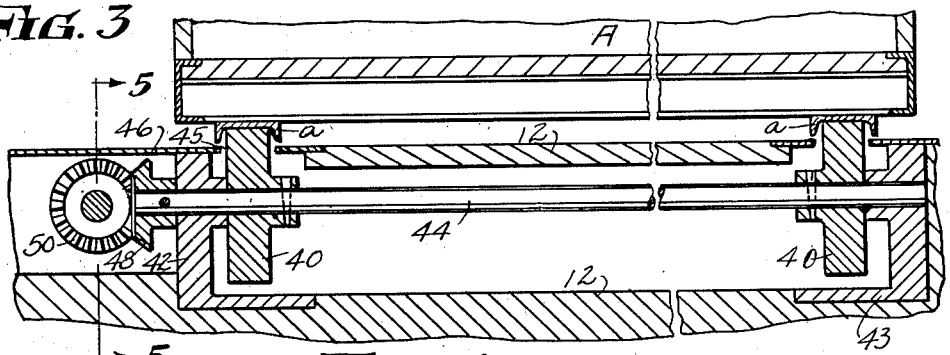
Fig. 4 is a vertical transverse section through one of the longitudinal conveyors, as indicated by the line 4—4 on Fig. 3.
Figure 5:
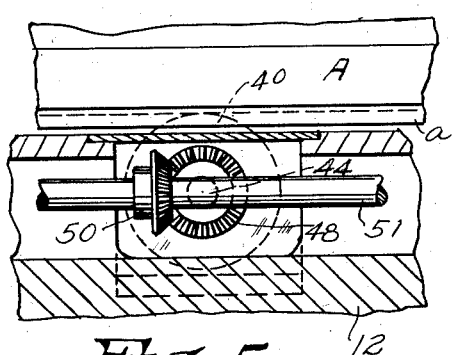
Fig. 5 is a detail of the roller driving gearing, being a vertical section on the line 5—5 in Fig. 4.

Figs. 3 to 5 illustrate a floor roller system which may constitute the longitudinal conveyors 14 and 15 on the intermediate platform 12. As shown in these views, pairs of rollers 40 are secured to transverse shafts 44 which are journalled in suitable supporting brackets 42 and 43 carried by the platform 12. The shafts and brackets are located in recesses formed in the top of the longitudinal support 12 and the rollers 40 extend above such top. As indicated in Fig. 4, the rollers extend through openings 45 in suitable cover plates 46, which are carried by the cement or other material forming the platform proper.

As shown, each shaft 44 carries a bevel gear 48 which meshes with a bevel gear 50 on longitudinal shaft 51. This shaft is connected by suitable reduction gearing with a driving motor 52. The gearing may be of the worm type, and is indicated as housed within the casing 53. The longitudinal shafts with their gears and also the driving mechanism are located below the top of the platform, so that only the floor rollers extend above such top.

Figure 6:
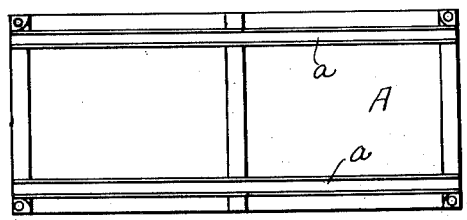
Fig. 6 is a bottom plan of one of the demountable automobile bodies.

The container or demountable body A preferably has formed on its underside suitable guides to cooperate with the floor rollers. These guides may readily be downwardly facing channel bars $a$, secured to the under side of the container base as illustrated in Figs. 4, 5 and 6. When such a container is deposited on the floor roller conveyor system, it is immediately propelled in one direction or the other according to the rotation of the rollers. It will be understood that all of the rollers in conveyor 14 rotate in one direction and those in conveyor 15 in the opposite direction, and are normally continuously rotating. Accordingly, whenever it is necessary to carry a body farther than the range of movement of any crane, or when it is desired to free the crane for other work, the body is deposited on one or the other of the conveyors and progressed thereby in the proper direction.

As indicated in Fig. 3, each longitudinal conveyor 14 or 15 is composed of groups of power driven floor rollers, and the motors for the respective groups may be controlled simultaneously or independently according to traffic conditions on the conveyor. Normally, all of the groups are in operation; and hence any crane may cause the transference of bodies from the region served by that crane to the region served by another crane by simply depositing the body on the conveyor moving in the proper direction. In case, however, of traffic congestion on the conveyor, at any region, the operator having charge of that region may stop the general conveyor and operate the conveyor in his region only until the congestion is relieved.

Any suitable means may be employed for controlling the motors of the conveyor groups to accomplish the operation above outlined. Such control is preferably effected from the cabs of any of the different cranes. I have given, in the drawings, diagrams showing, by way of example, one circuit arrangement which may be employed, if desired. This will hereinafter be more specifically described.

The body engaging shackles of the cradle may be operated by solenoids preferably controlled from the cabs of the respective traveling cranes, where the movement of the crane bridge, of the crane proper on the bridge, and of the mechanism for raising and lowering the cradle, is also controlled. Likewise, the operation of the floor rollers is preferably controlled from this cab. Accordingly, the crane operator controls the entire system for the area served by that crane. However, provision is made for enabling any crane operator to stop the entire conveyor system.

Now, let us assume that a train arrives on one of the tracks 11 with a large number of cars having demountable bodies intended for various destinations, and that trains of empty flat cars are made up on several of the tracks of group 10, waiting to receive the demountable bodies from the newly arrived train. Immediately, each of the crane operators operates his bridge and the crane on the bridge to carry the crane proper over the nearest demountable body on the arrived train which is to be transferred. He then lowers his cradle, engages it to the body, and lifts this body sufficiently to clear the car and, if necessary, sufficiently high to clear other bodies; transports it by moving the crane laterally on the bridge; and, if necessary, moving the bridge longitudinally on its support, so that the body is brought immediately over an available flat car on the outgoing train, whereupon the lowering operation deposits the body on its destined car.

The operation described is on the supposition that there is an available flat car within the area controlled by the crane which picks up the body. If no such flat car is available, the operator simply deposits the body on the conveyor and allows it to travel into the region of another crane. If there are available flat cars in such succeeding region, that operator picks up the demountable body by lowering his cradle into engagement with it, and to do this he does not need to stop the conveyor, but can make the engagement while the body is progressing. He then transfers the body to an available flat car. If no car is available in his region, he allows the body to go on to the next region.

In case the bodies unduly accumulate in any region,—which is likely to happen more particularly in the last region—the crane operator for that region operates the proper switch to stop the entire conveyor. Thereupon, he proceeds to dispose of the bodies within his area by means of his crane, either transferring them to available cars, or to some storage platform, or placing them on the other conveyor to move back in the other direction. The conveyor which was stopped, except as to the congested region, remains inactive in the other regions until some crane operator wishes to use it; in which case, when he may, by throwing his switch, start his portion only of the entire conveyor. When conditions warrant it, the entire conveyor may be set into operation by all of the operators throwing on their starting switches.

It will be seen from the above description that my system allows the very rapid and simultaneous transfer of various demountable bodies from an incoming train onto various flat cars of one or more outgoing trains. Both incoming and outgoing trains may be very long and the transfer may be effected from various regions simultaneously so that the outgoing train may be made up very quickly.

Reverting now to the floor roller system and the control thereof, the independent motors are electrically connected by cables of conductors with the switch mechanism in the various crane cabs, as will be well understood. There is one circuit connecting all of the motors in series for simultaneous operation of the entire conveyor, and individual short circuits, to enable each operator to operate his own section independently of the others. In Figs. 7 to 10 I have illustrated circuits which may effect the control of the conveyor 14 operating in the right-hand direction in Fig. 1; it being understood that a similar arrangement is provided for the conveyor 15, which operates in the opposite direction.

The series circuit of the control mechanism is diagrammatically illustrated in Fig. 7. In this figure M1, M2, M3, and M4 represent the motors which operate the floor rollers for respective successive sections or areas of the conveyor. The motor M4 operates the last or final area of the conveyor. Controllers C1, C2, C3 and C4 are located in respective crane cabs and arranged to control the motors M1, M2, M3 and M4, respectively. Associated with the motors M1, M2 and M3 are respective overload switches L1, L2 and L3. The last motor M4 is provided with a switch member L4, arranged to be actuated by actual contact with a container, when such container reaches the limit of the conveyor.

Electrical energy is supplied from suitable power lines 100 and 101. The line 100 leads directly to one pole of each of the motors. The other line 101 leads to the controller C1 and to a switch member 102 in such controller, to a line 103, to a similar switch member 102a located in the controller C2, to a line 103a, to the switch member 102b located in the controller C3, thence to the controller C4, and to a line 104, which is connected to a switch member 106 in each controller by independent lines 105. The switch members 106 are in turn connected by lines 107, which lead from respective controllers, to a contact 107 of respective overload switches, from which the current is conducted by switch members 108 to the contacts 109, and then to lines 110, solenoids 111, (the purpose of which will be hereinafter more fully explained), and by lines 112 to the opposite poles of respective motors. This arrangement is such that when a controller is turned to an "off" position, the series circuit is broken. The switch member 102a of the controller C2 in Fig. 8 is shown as turned to an "off" position, thereby opening the circuit between the lines 103 and 103a, and cutting the power from the line 105 and the motor.

When a controller, such as the controller C2 in Fig. 8, is thrown to an "off" position, because of a congestion of containers on the conveyor of that area, it is often desirable that other cranes may be individually operated, such as for instance, the cranes controlled by the motors M3 and M4. I therefore provide each controller with a parallel circuit, as well as the series circuit heretofore described. This permits the operator of each individual crane to operate that section or area of the conveyor over which his crane operates, even though the entire system has been thrown out, due to the opening of the series circuit by the operator of one crane, such as by the opening of the controller C2.

The parallel circuit is illustrated in Fig. 8, where it will be noted that a line 115 leads directly from the power line 101 and is joined to the switch contacts 116 by a line 117. The contacts 116 are arranged to be engaged by the switch members 106, 106a, 106b, 106c, respectively, as may be desired by the operator of such controllers. In Fig. 8 the controllers C1, C3 and C4 have been thrown to such positions. When in this position the switch members 106, 106a, 106b, 106c, join electrically, the contacts 116, and the contacts 118, which latter are connected to the lines 107 leading to the respective motors, as heretofore described. This provides each operator with a parallel circuit, as well as a series circuit, and permits the operation of any section of the conveyor independent of any other section.

In Fig. 8 the conveyor section corresponding to the motor M1 is shown in operation by reason of the switch C1 being thrown to the parallel circuit, whereas the switch C2 controlling the motor M2 has been thrown to an "off" position. In such an instance, a container, having been placed on the moving conveyor, corresponding to the section controlled by the motor M1, may reach the extreme limits of that conveyor section and be carried to the now non-rotating rollers of the conveyor operated by the motor M2, the controller C2 being in an "off" position. Due to the worm gear reduction between the rollers and their respective motors, the non-rotating roller would cause a frictional drag upon such container. This would serve to overload the motor M1, and in this case the overload coil 111, heretofore mentioned, would be sufficiently energized to throw the overload switch L1 from the position shown in Figs. 7 and 8, to the position shown in Fig. 9. This causes the overload switch member 108 to break the circuit between the switch contacts 107 and 109, interrupting the circuit from the controller C1 to its motor M1, thereby cutting the power from such motor and preventing damage or other injury to the container on that section of the conveyor, by reason of the stopping of such conveyor.

I have found it advantageous to so arrange the overload switches, L1, L2 and L3 that they are automatically reset when the next succeeding section of the conveyor is again set in operation. Referring to Fig. 9, it will be noted that, when the overload switch L1 has been thrown, a second overload switch member 120 connects contacts 121 and 122, which are connected by lines 123 and 124, to a solenoid coil 125 and the line 112 of the next succeeding motor, which in this case is the motor M2. The circuit is completed by the lines 126 which leads from the solenoid coils 125 to the power line 100, heretofore mentioned. Hence, when the power is again applied to the motor M2, electrical energy will pass through the solenoid coil 125, and cause it to reset the overload switch L1 and again restore the circuit to the motor M1. This provides a convenient automatic resetting of the overload switches, and eliminates the possibility of damage to the container by omitting manual operating mechanisms, which could be operated to restore the overload switch before the next succeeding area of conveyor is set in motion to advance the containers on the preceding conveyor area.

As heretofore mentioned, the last motor M4 is not provided with an overload switch. However, it is provided with a switch L4 arranged to stop such section of the conveyor when a container reaches the extreme limit thereof. As shown in the drawings, this switch comprises a switch arm 130, pivoted at 131, and normally retained in contact with a switch blade 132 by a suitable tension spring 133. The arrangement of the switch arm 130 is such that when any container reaches the extreme limit of the last section or area of the conveyor, it will strike the upper portion 134, of the arm 130, separating the switch arm from its contact 132 and breaking the circuit to the motor M4. The controller C4 being directly connected to said motor through the medium of lines 135 and 136, leading from the controller C4 to the switch arm 130, and from the switch contact 132 to the motor M4, respectively. When the crane for that area is operated to lift such container from the conveyor, the switch arm 130 will again be drawn into contact with the contact 132 by the spring 133, and the conveyor will be automatically placed in operation.

In Figs. 2 and 10 I have illustrated one manner of arranging the circuits so that the motors M may be controlled from the crane cab or cabs. Adjacent the crane runway are shown collector rails 120, from which power may be transmitted to the crane, as by shoes carried by arms 121. Where the cab moves transversely of the bridge as illustrated, bus-bars 122 (only part of which are shown) may carry the various circuit connections along the bridge in the usual manner. The collector rails may include power lines 123 for the bridge and crane requirements. The other circuits correspond to those shown in Figs. 7 to 9, similar parts being similarly designated. The series connections for circuit 103 are formed through collector shoes S1, S2, S3, S4 on the respective cranes. The collector rails D1, D2, D3 and D4 are shown sectionalized so that the crane operator may control the corresponding conveyor motor only when he is operating in that section.

It will easily be understood how each of the collector rails might extend for a greater distance, thus permitting control of the conveyors during a more extensive movement of the crane.

While I have described the circuits illustrated with considerable detail, it should be understood that my invention is independent of the specific circuit arrangement, and installations quite different from that shown in the diagrams may be employed so long as the general operation of the system is maintained. A preferred form of system includes the arrangement of the floor rollers in groups, and such control thereof that all the groups may operate together to make a single continuous conveyor; while, in case of congestion in any region, the conveyor, as a whole, may be stopped to enable such congestion to be relieved. It is not strictly necessary that the other sections of the conveyor be utilizable while the congestion is being relieved in one section; but it is a desirable characteristic, to avoid waste of time, and is provided for by the installation shown.

I claim:

1. In a freight-handling apparatus, the combination of parallel vehicle trackways, vehicles on the trackways, demountable bodies on the vehicles, a plurality of aligned power-driven conveyors extending parallel with the trackways and adapted to move demountable bodies positioned on the conveyors, a crane movable parallel with the conveyors and transversely for transferring demountable bodies from one vehicle to another vehicle or to the conveyor, means operable from the crane for operating one conveyor independently of the other conveyors and automatic means to stop one of the conveyors, said automatic means being operable by the movement of a body from such conveyor to an adjacent idle conveyor.

2. In a freight-handling apparatus, the combination of parallel vehicle trackways, vehicles on the trackways, demountable bodies on the vehicles, a plurality of aligned power-driven conveyors extending parallel with the trackways and adapted to move demountable bodies positioned on the conveyors, a plurality of cranes movable parallel with the conveyors and transversely for transferring the demountable bodies from one vehicle to another vehicle or to the conveyors, means operable from one of the cranes for simultaneously stopping all of the conveyors, and means operable from another crane for operating some of the conveyors when the first means has stopped all of the conveyors.

3. In a freight-handling apparatus, the combination of a plurality of demountable bodies, a plurality of aligned power-driven conveyors adapted to move demountable bodies positioned on the conveyors, and automatic means for stopping one of the conveyors operable by the movement of a body from said conveyor to an adjacent idle conveyor.

4. In a freight-handling apparatus, the combination of a plurality of demountable bodies, a plurality of aligned power-driven conveyors adapted to move demountable bodies positioned on the conveyors, automatic means for stopping one of the conveyors operable by the movement of a body from said conveyor to an adjacent idle conveyor, and a second automatic means for nullifying the effects of the first automatic means, said second means being operable by the starting of said idle conveyor.

BENJAMIN F. FITCH.